H. C. DORN.
MILK BOTTLE RECEPTACLE.
APPLICATION FILED OCT. 20, 1917.
1,316,286.
Patented Sept. 16, 1919.
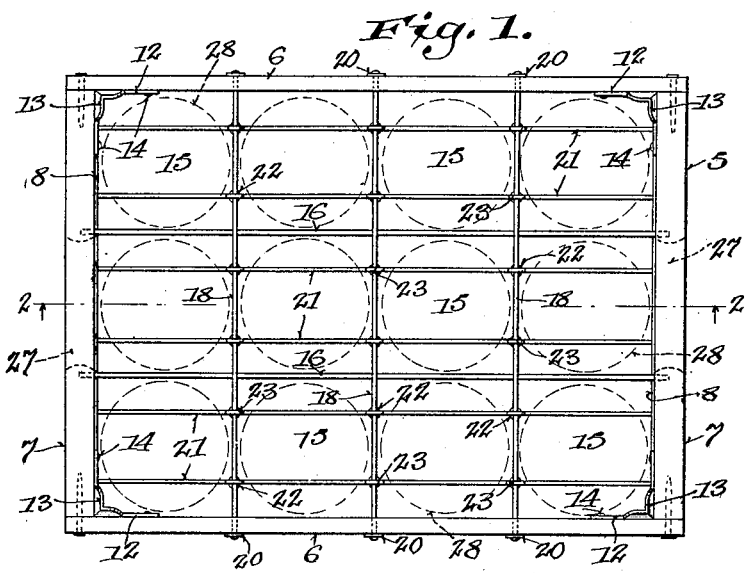
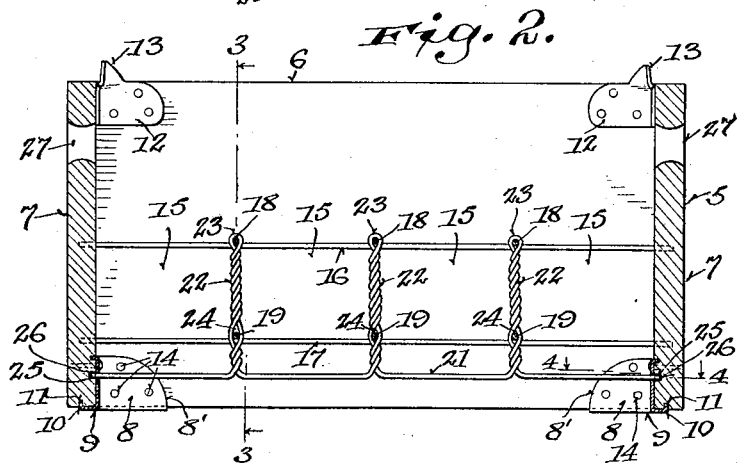
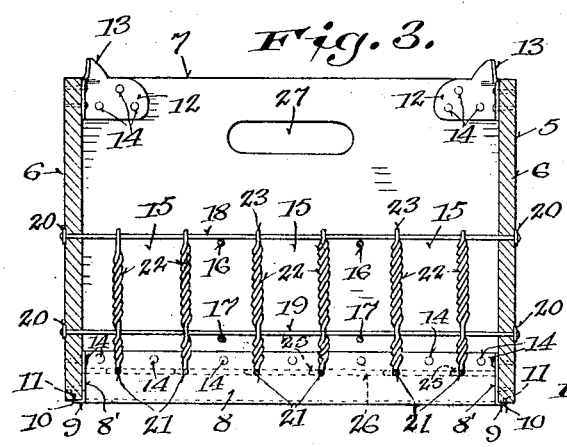
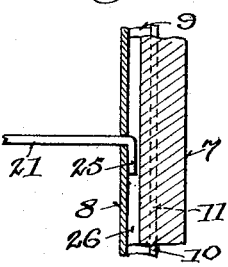

UNITED STATES PATENT OFFICE.

HENRY C. DORN, OF MILWAUKEE, WISCONSIN, ASSIGNOR OF ONE-THIRD TO HERMAN A. LUEDKE AND ONE-THIRD TO JOHN C. SCHROEDER, BOTH OF MILWAUKEE, WISCONSIN.

MILK-BOTTLE RECEPTACLE.

1,316,286.  Specification of Letters Patent.  Patented Sept. 16, 1919.

Application filed October 20, 1917. Serial No. 197,582.

*To all whom it may concern:*

Be it known that I, HENRY C. DORN, a citizen of the United States, and resident of Milwaukee, in the county of Milwaukee and State of Wisconsin, have invented new and useful Improvements in Milk-Bottle Receptacles, of which the following is a description, reference being had to the accompanying drawings, which are a part of this specification.

This invention relates to a milk bottle receptacle more particularly adapted for handling bottled milk.

It is one of the objects of the present invention to provide a milk bottle receptacle in the form of a box having means for holding the bottles separated from one another.

A further object of the invention is to provide a milk bottle receptacle in which the bottles are yieldingly supported in separated position to eliminate liability of breakage during handling.

A further object of the invention is to provide a milk bottle receptacle having means for holding the receptacles firmly stacked one above another and to permit the easy stacking or removal of the receptacle and to reinforce the bottom portion of the receptacle.

A further object of the invention is to provide a milk bottle receptacle in which the bottles are supported and maintained in separated position by wire or rod means connected to the box proper.

A further object of the invention is to provide a milk bottle receptacle which may be easily kept clean in a sanitary manner.

A further object of the invention is to provide a milk bottle receptacle which is of simple construction, is strong and durable and is well adapted for the purpose described.

With the above and other objects in view the invention consists of the improved milk bottle receptacle and its parts and combinations as set forth in the claims, and all equivalents thereof.

In the accompanying drawings in which the same reference characters indicate the same parts in all of the views:

Figure 1 is a top view of the improved milk bottle receptacle, the milk bottle being indicated by dotted circles;

Fig. 2 is a longitudinal sectional view thereof taken on line 2—2 of Fig. 1;

Fig. 3 is a transverse sectional view thereof taken on line 3—3 of Fig. 2; and

Fig. 4 is an enlarged sectional detail view taken on line 4—4 of Fig. 2.

Referring to the drawing the numeral 5 indicates a wooden rectangular box like structure having thin side portions 6 and thicker end portions 7 which are nailed or otherwise fastened together in any manner desired. The lower edges of the end portions are reinforced by metal bands 8 which are fastened to the inner surfaces of the end portions and have corner extensions 8' which are fastened to the side portions of the box. The lower edge portions of the reinforcing bands are channeled as indicated by the numeral 9 to extend beneath the lower edges of the box with the upturned edge portions 10 entering grooves 11 formed medially of the said lower edges. This construction guards and reinforces the lower edges of the box and the corner extensions reinforce the lower corner joints of the box.

The upper corner portions of the box are reinforced by angled corner members 12 which are fastened to both the end and side portions of the box and angled inwardly offset portions 13 which project upwardly from said corner members are formed to fit the corner portions of the reinforcing bands of the lower portions of a box stacked thereon.

The respective bands and corner members are preferably fastened to the sides and ends by nails 14 but other securing means may be used if desired.

The box is divided into bottle compartments 15 by upper and lower longitudinal rods 16 and 17 and upper and lower transverse rods 18 and 19. The longitudinal rod ends extend into the thick box ends and the transverse rods extend through the thinner box sides and their ends are riveted over washers 20 to prevent the thin material of which the box sides are formed from bulging outwardly.

The bottles placed in the compartments 15 are supported on pairs of longitudinally extending rods or wires 21 which form the bottom portions of the compartments 15. Medial portions of the rods 21 immediately beneath the transverse wires are twisted to form upright portions 22 having eyes 23 and 24 through which the upper and lower transverse rods extend thus tying the partition and bottom rods together and forming a rigid structure therebetween.

The end portions of the bottom rods extend through the metal bands and are bent at right angles as indicated by the numeral 25 to form a firm connection therewith. To accommodate the bent ends 25 of the rods the box ends are formed with grooves 26 into which the bent ends extend.

Elongated slots 27 are formed in the box ends adjacent the upper ends for convenience in carrying the receptacle. The bottles are indicated by dotted circles 28 in Fig. 1.

From the foregoing description it will be seen that the milk bottle receptacle is of very simple construction and that the bottles are held in spaced relation in the different compartments and the partitions being formed of rods or wire a yielding support is provided which tends to eliminate breakage. The rod or wire construction with the open box bottom also forms a sanitary structure which may be easily kept clean.

What I claim as my invention is:

1. A bottle receptacle, comprising side and end members connected together to form a box-like structure with an open top and bottom portion, longitudinal and transverse rods forming partitions to divide the structure into compartments, and rods forming bottoms for said compartments and having medial portions which are connected to some of the other rods.

2. A bottle receptacle, comprising side and end members connected together to form a box-like structure with an open top and bottom portion, longitudinal and transverse rods forming partitions to divide the structure into compartments, and rods forming bottoms for said compartments and having medial portions which are connected to the transverse rods.

3. A bottle receptacle, comprising side and end members connected together to form a box-like structure with an open top and bottom portion, longitudinal and transverse rods forming partitions to divide the structure into compartments, and rods forming bottoms for said compartments and having medial twisted portions forming eyes through which some of the other rods extend.

4. A bottle receptacle, comprising side and end members connected together to form a box-like structure with an open top and bottom portion, longitudinal and transverse rods forming partitions to divide the structure into compartments, and rods forming bottoms for said compartments and having medial twisted portions forming eyes through which the transverse rods extend.

5. A bottle receptacle, comprising side and end members connected together to form a box-like structure with an open top and bottom portion, pairs of longitudinal rods connected to the opposite end members, pairs of transverse rods connected to the opposite sides, said rods forming compartments, and pairs of rods forming bottoms for each compartment and having medial twisted portions which connect with some of the other rods.

6. A bottle receptacle, comprising side and end members connected together to form a box-like structure with an open top and bottom portion, pairs of longitudinal rods connected to the opposite end members, pairs of transverse rods connected to the opposite sides, said rods forming compartments, and pairs of rods forming bottoms for each compartment and having medial twisted portions forming eyes through which the pairs of transverse rods extend.

7. A bottle receptacle, comprising side and end members connected together to form a box-like structure with an open top and bottom portion, pairs of longitudinal rods connected to the opposite end members, pairs of transverse rods connected to and extending through the opposite side members and riveted over at their end portions, said rods forming partitions to divide the structure into compartments, and pairs of longitudinal rods forming bottoms for each compartment and having medial upstanding twisted portions forming pairs of eyes through which the pairs of transverse rods extend.

In testimony whereof, I affix my signature.

HENRY C. DORN.

Copies of this patent may be obtained for five cents each, by addressing the "Commissioner of Patents, Washington, D. C."